(12) United States Patent
Yamada et al.

(10) Patent No.: US 8,702,358 B2
(45) Date of Patent: Apr. 22, 2014

(54) TOOL HOLDER FIXING STRUCTURE

(75) Inventors: Koji Yamada, Toyota (JP); Toshitaka Kamikubo, Okazaki (JP); Kiyotaka Shiga, Okazaki (JP); Yoshihito Yamaguchi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 757 days.

(21) Appl. No.: 12/988,953

(22) PCT Filed: Apr. 9, 2009

(86) PCT No.: PCT/JP2009/057627
§ 371 (c)(1),
(2), (4) Date: Oct. 21, 2010

(87) PCT Pub. No.: WO2009/131049
PCT Pub. Date: Oct. 29, 2009

(65) Prior Publication Data
US 2011/0038680 A1 Feb. 17, 2011

(30) Foreign Application Priority Data
Apr. 25, 2008 (JP) .................. 2008-116093

(51) Int. Cl.
*B23Q 3/12* (2006.01)
*B23B 31/00* (2006.01)
*B23Q 11/00* (2006.01)

(52) U.S. Cl.
CPC . *B23Q 3/12* (2013.01); *B23B 31/00* (2013.01); *B23Q 11/00* (2013.01)

USPC ........................ 409/234; 408/239 A (58) Field of Classification Search
CPC ........................................... B23Q 3/12
USPC ........................ 409/234; 408/239 A
See application file for complete search history.

(56) References Cited

U.S. PATENT DOCUMENTS

| 4,723,877 A * | 2/1988 | Erickson ....................... 409/234 |
| 8,348,560 B1 * | 1/2013 | Furman et al. ................ 409/138 |
| 2005/0158135 A1 * | 7/2005 | Massa et al. .................. 409/234 |

FOREIGN PATENT DOCUMENTS

| DE | 29809653 | * | 8/1998 | ............. B23B 31/00 |
| JP | 64-087107 A | | 3/1989 | |
| JP | 06-226515 A | | 8/1994 | |
| JP | 08-281528 A | | 10/1996 | |
| JP | 2006-334676 A | | 12/2006 | |
| JP | 2007-518585 A | | 7/2007 | |
| WO | 2005/072210 A2 | | 8/2005 | |

* cited by examiner

*Primary Examiner* — Andrea Willington
*Assistant Examiner* — Mohammad Nourbakhsh
(74) *Attorney, Agent, or Firm* — Kenyon & Kenyon LLP (57) ABSTRACT

A tool holder fixing structure is arranged to fix a tool holder for holding a tool attached with a throwaway tip to a tool-holder holding part of a machine tool so that a foreign-matter receiving clearance is provided between the tool holder and the tool-holder holding part. The foreign-matter receiving clearance is defined in a range of +30° to −30° from a cutting-edge position of the throwaway tip assumed as an original point and in a range of 150° to 210° from the original point, respectively.

5 Claims, 10 Drawing Sheets

TOOL HOLDER FIXING STRUCTURE

This is a 371 national phase application of PCT/JP2009/057627 filed 9 Apr. 2009, which claims priority to Japanese Patent Application No. 2008-116093 filed 25 Apr. 2008, the contents of which are incorporated herein by reference.

TECHNICAL FIELD

The present invention relates to a tool holder fixing structure for fixing a tool holder for holding a tool attached with a cutting blade such as a throwaway tip, to a tool-holder holding part of a machine tool.

BACKGROUND ART

Patent Literature 1 discloses a technique for washing away foreign matters caught between a tool and a tool holding part by flowing a fluid into a flow passage formed in the tool holding part, thereby preventing deterioration in machining accuracy due to deviation of a rotation axis of the tool. Furthermore, this technique is arranged to detect a trouble that foreign matters are caught between the tool and the tool holding part without being washed away.

CITATION LIST

Patent Literature

Patent Literature 1: JP2006-334676A

SUMMARY OF INVENTION

Technical Problem

However, the conventional tool holder fixing structure has the following disadvantages. Specifically, it is not always possible to detect with 100 percent precision that foreign matters are caught. Even if such trouble could be detected, the machine tool must be stopped every time the trouble is detected and the foreign matters have to be removed by hand, resulting in a decrease in capacity utilization of the machine tool.

The present invention has been made to solve the above problems and has an object to provide a tool holder fixing structure capable of preventing foreign matters from having an adverse effect on a product even when a cutting work is performed while the foreign matters are caught.

Solution to Problem (1) To achieve the above object, one aspect of the present invention provides a tool holder fixing structure comprising: a tool including a cutting blade, a tool holder for holding the tool, and a tool-holder holding part of a machine tool for fixing the tool holder to the machine tool, wherein the tool holder and the tool-holder holding part have contact surfaces configured to form a clearance therebetween for receiving foreign matters, and the foreign-matter receiving clearance is provided in an entire angular region in a circumferential range of +30° and −30° from a point of a cutting edge of the cutting blade assumed as an original point and in an entire angular region in a circumferential range of 150° or more and 210° or less from the original point.

(2) In the tool holder fixing structure (1), preferably, the foreign-matter receiving clearance is provided at a center of contact surfaces of the tool holder and the tool-holder holding part.

(3) In the tool holder fixing structure (1) or (2), preferably, the cutting blade is a throwaway tip.

(4) In the tool holder fixing structure (1) or (2), preferably, the contact surface of the tool holder is an outer peripheral surface formed with a cutout for providing the foreign-matter receiving clearance.

(5) In the tool holder fixing structure (1) or (2), preferably, the contact surface of the tool-holder holding part is an inner surface formed with a cutout for providing the foreign-matter receiving clearance.

Advantageous Effects of Invention

The tool holder fixing structure mentioned above according to the present invention can provide the following operations and effects.

In the tool holder fixing structure for fixing the tool holder for holding the tool attached with the cutting blade such as a throwaway tip and a brazed tip to the tool-holder holding part of the machine tool, the tool holder and the tool-holder holding part are formed to provide therebetween the clearance or space for receiving foreign matters, and the foreign-matter receiving clearance is formed in the range of +30° to −30° from the cutting-edge position assumed as the original point and in the range of 150° or more and 210° or less from the original point in a diametrical cross-section of the tool holder.

According to the experiments carried out by the present inventors, when foreign matters (e.g., foreign matters each having a thickness of 10 μm) entered between the tool holder and the tool-holder holding part in the range of +30° to −30° from the cutting-edge position assumed as the original point and in the range of 150° to 210° from the original point, an error of 20 μm or more was found in the product accuracy.

On the other hand, in case foreign matters (e.g., foreign matters each having a thickness of 10 μm) entered outside the range of +30° to −30° from the original point and outside the range of 150° or more and 210° or less from the original point, an error 20 μm or less was found in the product accuracy. In particular, in the case where foreign matters entered a position at an angle of 90° or 270° in the diametrical cross-section of the tool holder, little difference was found from the case where no foreign matters entered the gap.

In other words, when the foreign matters enter outside the circumferential range of +30° to −30° from the original point and outside the circumferential range of 150° to 210° from the original point, it was confirmed that less problems occurred.

The tool holder is moved only in an axis direction with respect to the tool-holder holding part. Thus, even when foreign matters enter between the tool holder and the tool-holder holding part, the foreign matters are unlikely to move in a rotation direction. In other words, when the foreign-matter receiving clearance is provided in a partial zone with respect to the outer periphery of the tool holder, the foreign matters will not move in a circumferential direction and enter in the clearance.

Even when foreign matters enter between the tool holder and the tool-holder holding part, the foreign matters will be received in the clearance provided in the circumferential range of +30° to −30° from the original point and the circumferential range of 150° or more and 210° or less from the original point. Thus, the foreign matters are unlikely to affect the machining accuracy.

On the other hand, in case foreign matters enters outside the circumferential range of +30° to −30° from the original point and outside the circumferential range of 150° to 210° from the original point, where no foreign-matter receiving clearance is provided, the foreign matters will be caught between the tool holder and the tool-holder holding part but will less affect the machining accuracy. In particular, when the foreign matters are caught in a position at an angle of 90° or 270° relative to the original point, the foreign matters are unlikely to have an influence on the machining accuracy.

Furthermore, the foreign-matter receiving clearance is provided at the center of the contact surfaces of the tool holder and the tool-holder holding part. Accordingly, the tool holder and the tool-holder holding part can remain contact on both ends of the contact surfaces in the axis direction. Thus, the tool holder can have high rigidity.

The foreign-matter receiving clearance is provided in only a circumferential range of the tool holder by 120°, that is, a sum of an angular width of 60° centered on the original point and an angular width of 60° between 150° and 210° from the original point. Accordingly, it is possible to reduce the area of the foreign-matter receiving clearance to 28% or less as compared with the area of the full contact surfaces of the tool holder and the tool-holder holding part if provide no foreign-matter receiving clearance. This makes it possible to maintain the rigidity of the tool holder. In addition, even when the foreign-matter receiving clearance is provided, the rigidity of the tool holder can be maintained at almost the same level as in the case where no foreign-matter receiving clearance is provided. Accordingly, the machining accuracy is unlikely to be deteriorated.

DESCRIPTION OF EMBODIMENTS

A detailed description of preferred embodiments of a tool holder fixing structure embodying the present invention will now be given referring to the accompanying drawings.

Figure 1:
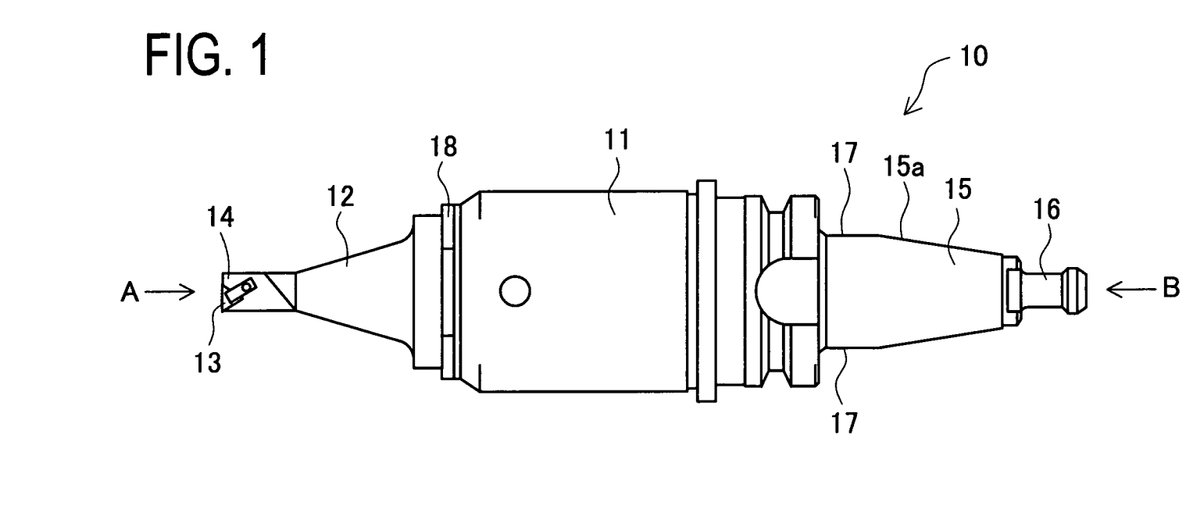
FIG. 1 is a front view of a tool holder of a first embodiment of the present invention.
Figure 2:
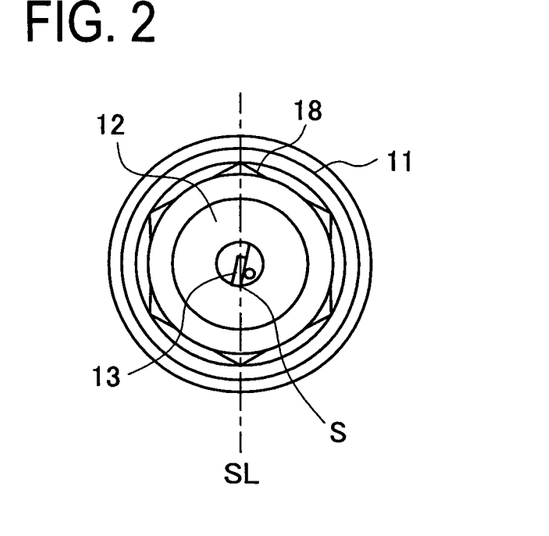
FIG. 2 is a left side view of the tool holder as viewed in the direction of an arrow A in FIG. 1.
Figure 3:
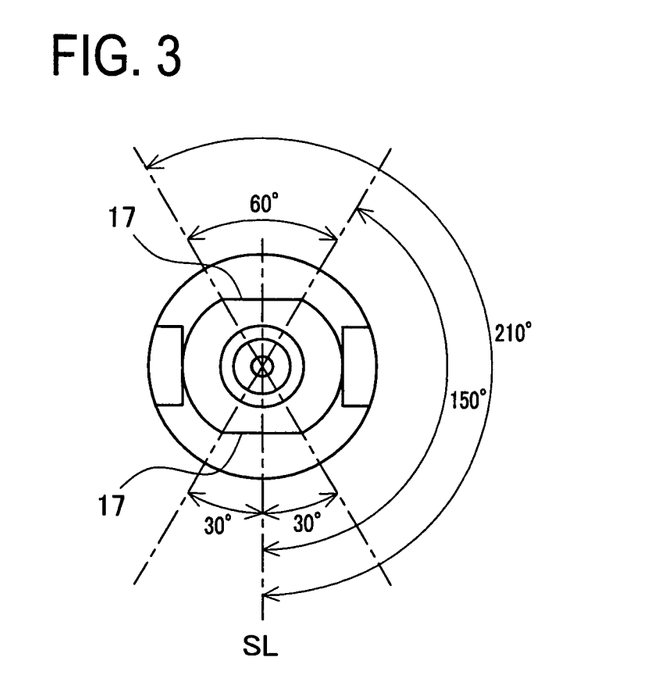
FIG. 3 is a right side view of the tool holder as viewed in an arrow B in FIG. 1.
Figure 13:
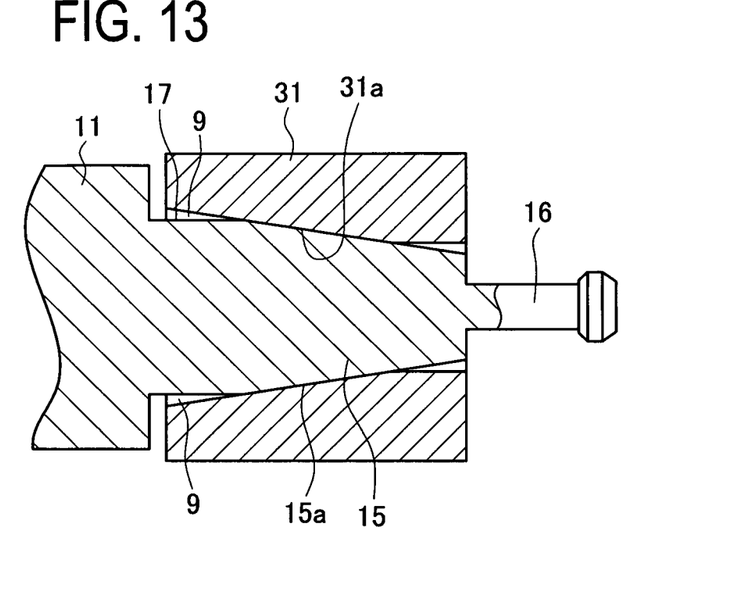
FIG. 13 is a cross sectional view of the tool holder mounted in a holding part of a machine tool in the first embodiment.

FIG. 1 is a front view of a tool holder 10 of a first embodiment. FIG. 2 is a left side view of the holder 10 viewed in the direction of an arrow A in FIG. 1. FIG. 3 is a right side view of the same viewed in the direction of an arrow B in FIG. 1. FIG. 13 is a cross sectional view showing a state where the holder 10 is mounted in a tool-holder holding part 31 (hereinafter, also referred to as a "holding part 31") of a machine tool.

The tool holder 10 includes a coupling part 15 which is fitted in the holding part 31 to couple the tool holder 10 to the machine tool. The coupling part 15 has an inclination surface (a tapered surface) 15a to be fitted in the holding part 31. The coupling part 15 is connected, at a right end thereof, to a pull part 16. When this pull part 16 is grasped and pulled rightward in FIG. 1 by a pulling means (not shown) of the holding part of the machine tool, as shown in FIG. 13, the tool holder 10 is fitted in the holding part 31 with the tapered surface 15a being in close contact with an inner inclination portion (a tapered portion) 31a of the holding part 31. This close fitting allows the tool holder 10 to be positioned in place with respect to the holding part 31 of the machine tool. Simultaneously, by a friction force resulting from the contact surface pressure between the tapered surface 15a and the tapered portion 31a, machining rotation torque is transmitted from the holding part 31 to the tool holder 10.

The coupling part 15 is integrally connected, at a left end thereof, to a holder main body 11. A tool 12 is connected to a left end of the holder main body 11. The tool 12 has a distal end formed with a tip attachment member 14. The tool 12 is mountable and dismountable with respect to the holder main body 11. While the tool 12 is mounted to the main body 11, the tool 12 and the main body 11 constantly remain in the same positional relationship in a rotation direction. A hexagonal spanner retainer 18 is formed on the periphery of the left end of the main body 11.

To the tip attachment member 14, a throwaway tip 13 serving as a cutting blade is detachably attached. This throwaway tip 13 is a triangular tip easy to replace, commercially available, and widely usable in machine tools.

As shown in FIG. 2, a line joining a cutting edge S of the throwaway tip 13 and a central axis of the holder main body 11 is assumed to be a cutting-edge position SL. The positional relationship between the tool 12 and the holder main body 11 is always constant. Accordingly, the position of the cutting edge S of the throwaway tip 13 in the rotation direction constantly remains unchanged with respect to the holder main body 11 and the coupling part 15.

As shown in FIGS. 1 and 3, the coupling part 15 is formed, on the outer periphery, with cutouts 17 (flat surfaces in this embodiment) to provide foreign-matter receiving clearances. Specifically, in a diametrical cross-section of the tool holder 10, the cutouts 17 are located in a range of +30° to −30° from the cutting-edge position SL and in a range of 150° or more to 210° or less from the cutting-edge position SL. As shown in FIG. 13, when the tool holder 10 is mounted in the holding part 31, each cutout 17 and the holding part 31 define a clearance (a space) 9 for receiving foreign matters. Each cutout 17 is formed by chamfering the coupling part 15 with a milling machine or the like.

The following explanation is given to the operations and effects of the foreign-matter receiving clearance 9.

The present inventors performed an experiment about the influence of the foreign matters caught between the tapered surface 15a of the tool holder 10 and the tapered portion 31a of the holding part 31 on machining accuracy of the machine tool.

Figure 7:
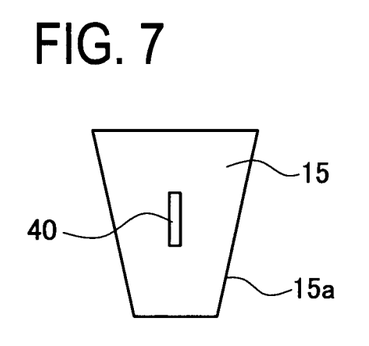
FIG. 7 is a diagram showing an experimental condition.

FIG. 7 shows experimental conditions. An adhesive tape 40, which is 2 mm in width and 12 mm in length, was stuck at a predetermined angular position on the tapered surface 15a of the tool holder 10. The predetermined angular position was changed to different angles relative to the cutting-edge position SL. The adhesive tape 40 was stuck to be centered at the predetermined angular position. As the adhesive tape 40, two kinds of tape were prepared; one having a thickness of 10 µm and the other having a thickness of 50 µm. After the experiments using the adhesive tape 40, it was found that the state of the adhesive tape 40 was unchanged before and after the experiments.

The experiments were implemented under three conditions: (1) No adhesive tape; (2) With the adhesive tape 40 having a thickness of 10 µm; and (3) With the adhesive tape 40 having a thickness of 50 µm. Under each of the conditions (1) to (3), the experiments were conducted by changing the position of the adhesive tape 40 in steps of 30° from the cutting-edge position SL. In the experiments, under each of the above conditions changed variously, a hole machining work was actually performed and the inside diameter of a machined hole was measured in an X-direction and a Y-direction. The X-direction and the Y-direction intersect each other and are adopted irrespective of the cutting-edge position.

Figure 8:
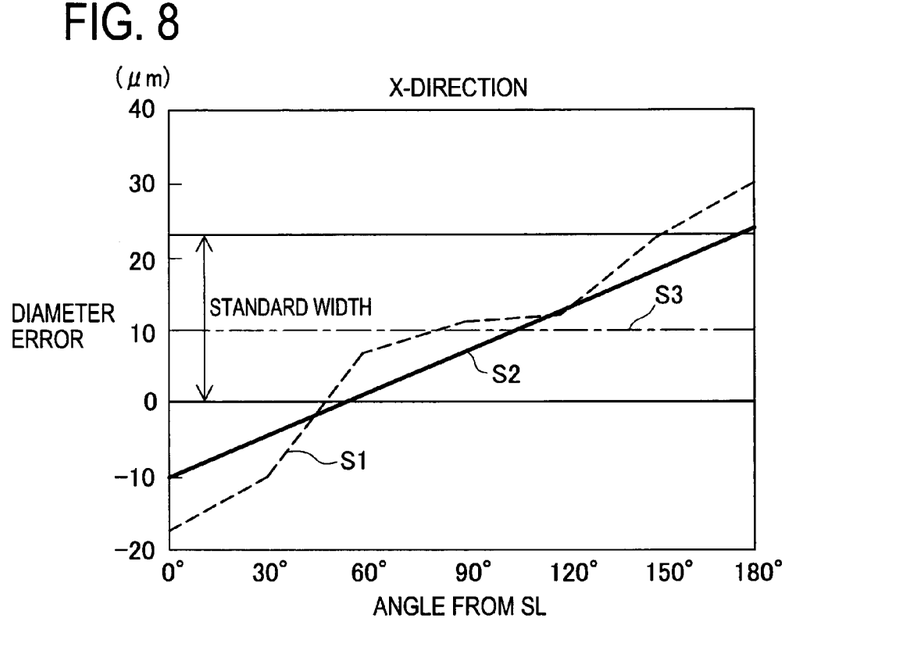
FIG. 8 is a graph showing experimental data measured in an X-direction.
Figure 9:
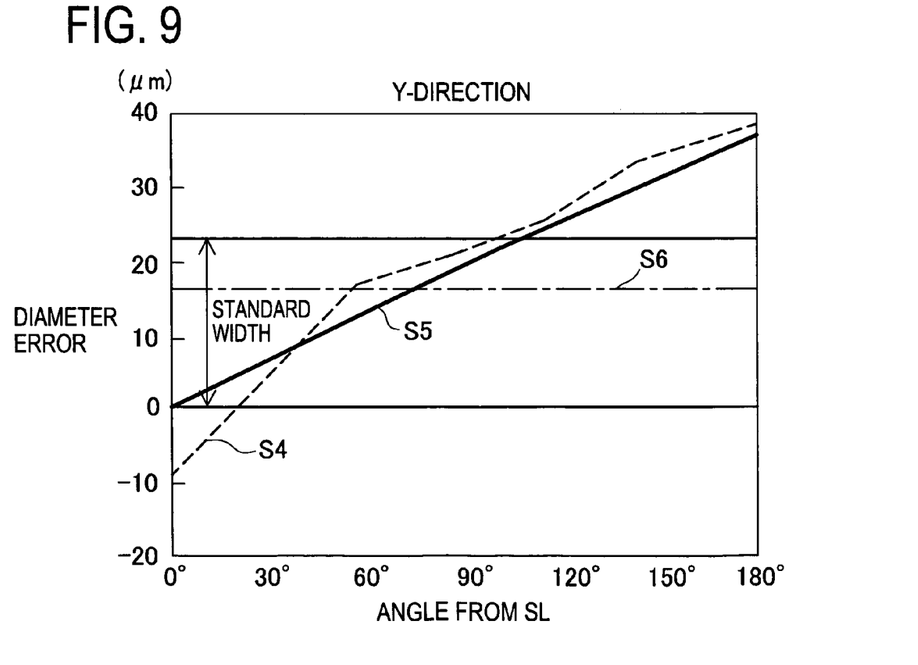
FIG. 9 is a graph showing experimental data measured in a Y-direction.

FIG. 8 is a graph showing data measured in the X-direction. FIG. 9 is a graph showing data measured in the Y-direction. In those graphs, a vertical axis represents inside diameter errors of the machined holes in units of µm. A permissible error (tolerance) of the inside diameter for a hole is a range of 0 to plus several tens µm. Measurement in the two X- and Y-directions is made in consideration of the case of machining a hole in an elliptic shape.

In FIGS. 8 and 9, a lateral axis represents positional angles of the adhesive tape 40 from the cutting-edge position SL. In the graphs, the lines S1 and S4 represent data resulting from the use of the adhesive tape 40 having a thickness of 50 µm. The lines S2 and S5 represent data resulting from the use of the adhesive tape 40 having a thickness of 10 µm. The lines S3 and S6 represent data resulting from the nonuse of the adhesive tape 40.

It is found from FIG. 8 that, in the case of using no adhesive tape 40, as indicated by the line S3, the diameter errors are uniformly 10 µm which falls within a standard range.

In the case of sticking the adhesive tape 40 of 50 µm at an angle of 0° to about 50° from the cutting-edge position SL, the diameter errors of the machined holes are negative, which are outside the standard range, as indicated by the line S1. When the adhesive tape 40 is attached at an angle of about 50° to about 150°, the diameter errors are 0 to 22 µm, which falls within the standard range. For an angle of about 150° or more, the diameter error is 22 µm or more, which is outside the standard range.

In the case of sticking the adhesive tape 40 of 10 µm at a positional angle of 0° to about 60° from the cutting-edge position SL, the diameter errors of the machined holes are negative, falling outside the standard range, as indicated by the line S2. When the adhesive tape 40 was stuck at a positional angle of about 60° to about 170°, the diameter errors are 0 to 22 µm which fall within the standard range. For a positional angle of about 170° or more, the diameter error is 22 µm which is outside the standard range.

In particular, in both cases of using the adhesive tapes 40, 10 µm and 50 µm in thickness, when each adhesive tape 40 is located near at a 0° angle and at a 180° angle, the diameter errors are largely deviated from the standard range.

It is found from FIG. 9 that, in the case of sticking no adhesive tape 40, the diameter errors of the machined holes are uniformly 16 µm which falls in the standard range.

In the case of sticking the adhesive tape 40 having a thickness of 50 µm at an angular position of 0° to about 20° from the cutting-edge position SL, the diameter errors are negative, falling outside the standard range, as indicated by the line S4. For the angular position of about 20° to about 100°, the diameter errors are between 0 to +22 µm, falling within the standard range. For the angular positions of about 100° or more, the diameter errors are 22 µm or larger, which falls outside the standard range.

In the case of sticking the adhesive tape 40 having a thickness of 10 µm at an angular position in a range of 0° to about 110° from the cutting-edge position SL, the diameter errors are +22 µm or less, falling within the standard range, as indicated by the line S5. For the angular positions of about 110° or more, the diameter errors are 22 µm or larger, which falls outside the standard range.

In particular, in both cases of sticking the adhesive tapes 40, 10 µm and 50 µm in thickness, it is found that the diameter errors are largely deviated from the standard range when each adhesive tape 40 is located near at a 0° angle and at a 180° angle.

According to the experiments conducted by the present inventors, as mentioned above, in which the cutting-edge position SL of the cutting edge S of the throwaway tip 13 is assumed to be an original point. When foreign matters (e.g. foreign matters each having a thickness of 10 µm or 50 µm) entered between the tool holder 10 and the holding part 31 and in a circumferential range of +30° to −30° from the cutting-edge position SL and in a circumferential range of 150° or more and 210° or less from the cutting-edge position SL, the accuracy error of 20 µm or more was found in the products.

On the other hand, in case foreign matters (e.g. foreign matters each having a thickness of 10 µm) entered between the tool holder 10 and the holding part 31 and outside the circumferential range of +30° to −30° from the cutting-edge position SL and outside the circumferential range of 150° or more and 210° or less from the cutting-edge position SL, the accuracy error of 20 µm or less was found. When foreign matters entered between the tool holder 10 and the holding part 31 at a 90° or 270° position to the original point, no or little difference was found from the case with no foreign matter. However, in case foreign matters each having a thickness of 50 µm enter in such places, the diameter errors may fall outside the standard range.

In other words, when the foreign matters (foreign matters each having at least a thickness of about 10 µm) entered outside the circumferential range of +30° to −30° from the cutting-edge position SL and outside the circumferential range of 150° or more and 210° or less from the cutting-edge position SL, it was found that less problems occurred in the machining accuracy.

On the other hand, in the case where the cutouts 17 are formed in the coupling part 15, rigidity of the cutting edge of the throwaway tip 13 is an important consideration. As to the rigidity, therefore, simulation analysis was made. Specifically, this simulation analysis was performed by applying a predetermined load (100 N) which is a static load to the cutting edge of the throwaway tip 13 from the side while the tool holder 10 is fixed to the holding part 31 and then measuring a maximum displacement amount of the cutting edge S. In the case where no cutout 17 was formed, the maximum displacement amount was 0.35 mm. The predetermined load was set to 100 N because a load applied during cutting is usually 100 N.

In the case where the cutouts 17 were formed, a maximum displacement amount was 0.38 mm. The maximum displacement amount was larger by 0.03 mm but it is not practically problematic.

In the present embodiment in which the foreign-matter receiving clearances 9 are provided, a contact area of the tapered surface 15a and the tapered portion 31a is 89.5% as compared with the case where no foreign-matter receiving clearance 9 is provided. This corresponds to a reduction of 10.5% of the contact area, but the rigidity is not practically problematic.

As explained in detail above, the tool holder fixing structure of the present embodiment is arranged to fix the tool holder 10 for holding the tool 12 attached with the throwaway tip 13 to the tool-holder holding part 31 of the machine tool and the foreign-matter receiving clearances 9 are formed between the tool holder 10 and the holding part 31. Furthermore, the clearances 9 are formed in the circumferential range of +30° to −30° from the cutting-edge position SL of the throwaway tip 13 assumed as the original point and in the circumferential range of 150° or more and 210° or less from the cutting-edge position SL, respectively. Even when foreign matters enter between the tapered surface 15a of the tool holder 10 and the tapered portion 31a of the tool-holder holding part 31, the foreign matters entering in the circumferential range of +30° to −30° from the cutting-edge position SL and in the circumferential range of 150° or more and 210° or less from the cutting-edge position SL will be received in the foreign-matter receiving clearances 9. Thus, the foreign matters are unlikely to affect the machining accuracy of the throwaway tip 13.

A second embodiment of the present invention will be explained below. The second embodiment is substantially the same in structure as the first embodiment excepting the shape of a cutout defining a foreign-matter receiving clearance. Accordingly, the following explanation will be made with a focus on differences from the first embodiment without repeating explanations about the same parts or components.

Figure 4:
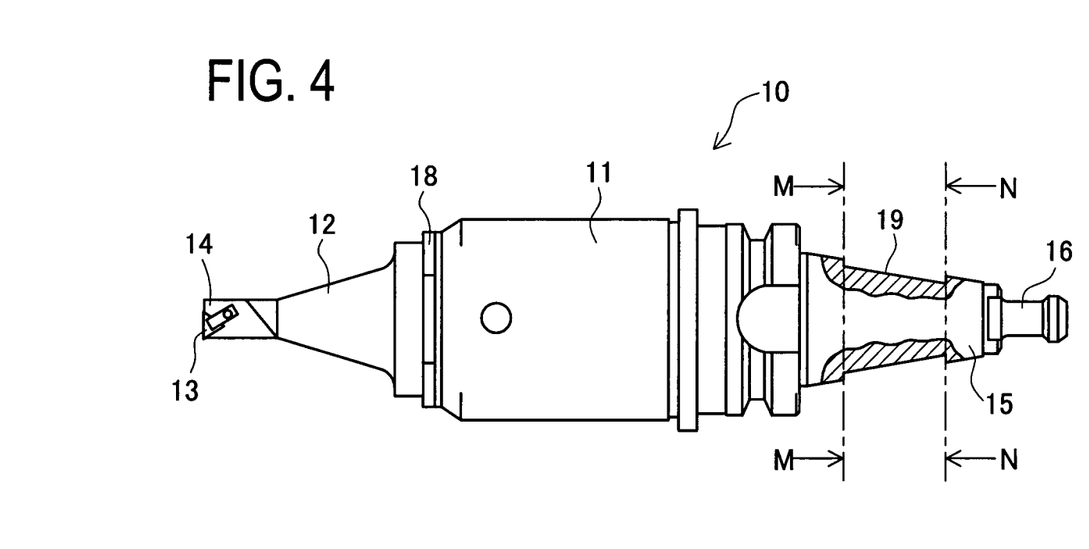
FIG. 4 is a front view of a tool holder of a second embodiment of the present invention.
Figure 5:
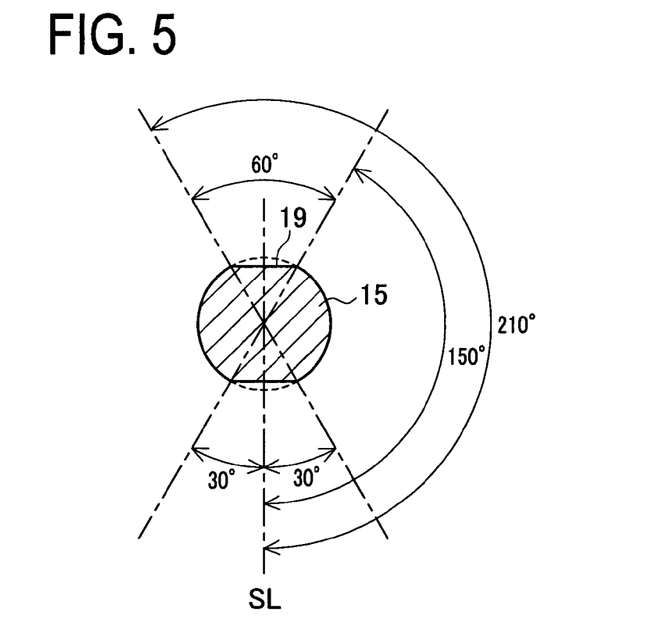
FIG. 5 is a cross sectional view of the tool holder taken along a line M-M in FIG. 4.
Figure 6:
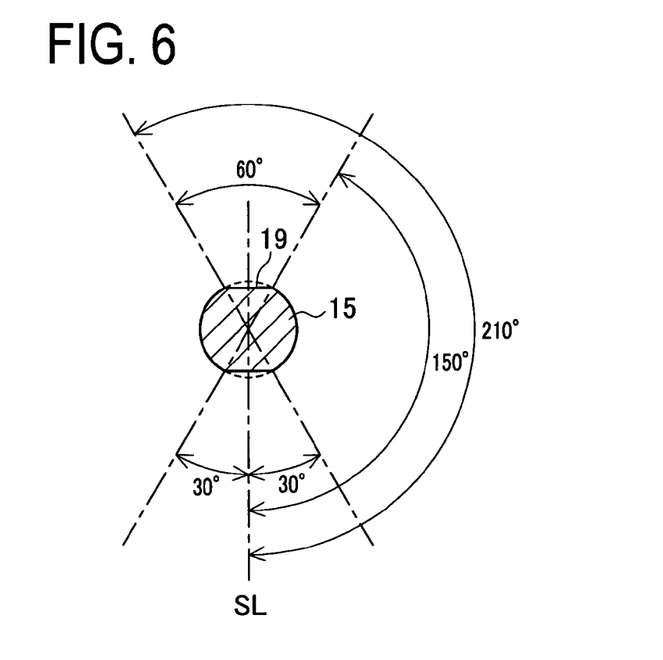
FIG. 6 is a cross sectional view of the tool holder taken along a line N-N in FIG. 4.

FIG. 4 is a front view of a tool holder 10 of the second embodiment. A left side view thereof is the same as FIG. 2 and hence is omitted. FIG. 5 is a cross sectional view of the tool holder 10 taken along a line M-M in FIG. 4 and FIG. 6 is a cross sectional view of the same taken along a line N-N in FIG. 4. In the second embodiment, as shown in FIG. 4, cutouts 19 for receiving foreign matters are each formed at a center of the tapered surface 15a of the coupling part 15 in the axis direction thereof. Since each cutout 19 is formed at the center of the tapered surface, the tapered surface 15a and the tapered portion 31a contact each other on both sides of each cutout 19 in the axis direction. Thus, the tool holder 10 can have high rigidity.

As shown in FIGS. 5 and 6, the cutouts 19 are formed in a circumferential range of +30° to −30° from the cutting-edge position SL and in a circumferential range of 150° or more and 210° or less from the cutting-edge position SL.

Figure 14:
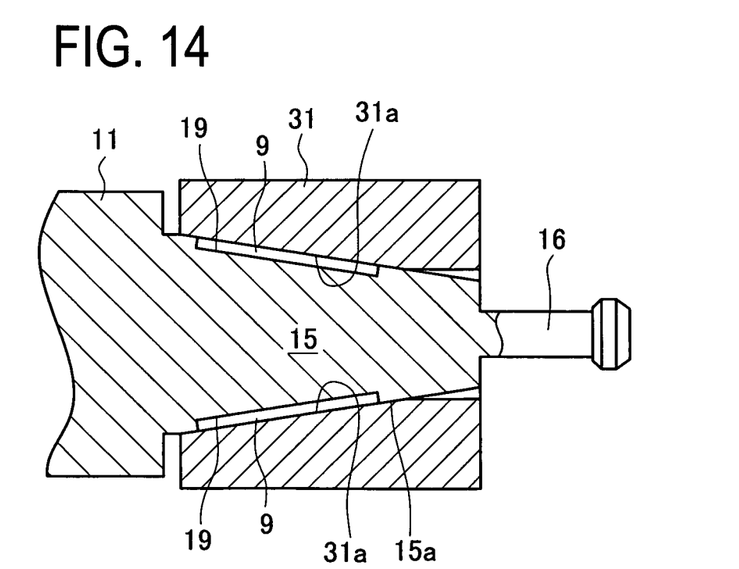
FIG. 14 is a cross sectional view of the tool holder mounted in the holding part of the machine tool in the second embodiment.

FIG. 14 is a cross sectional view showing a state where the tool holder 10 is mounted in the tool-holder holding part 31.

The coupling part 15 has a tapered surface 15a to be fitted in the tool-holder holding part 31 of the machine tool. The coupling part 15 is connected, at its right end, to a pull part 16. When this pull part 16 is grasped and pulled rightward in FIG. 4 by a pulling means (not shown) of the holding part 31, as shown in FIG. 14, the tool holder 10 is fitted in the holding part 31 with the tapered surface 15a being in close contact with a tapered portion 31a. This close fitting allows the tool holder 10 to be positioned in place with respect to the holding part 31. Simultaneously, by a friction force resulting from the contact surface pressure between the tapered surface 15a and the tapered portion 31a, machining rotation torque is transmitted from the holding part 31 to the tool holder 10.

As shown in FIG. 14, each foreign-matter receiving clearance 9 is defined by the tapered surface 15a and the tapered portion 31a around the center thereof in the axis direction. Since the tapered surface 15a and the tapered portion 31a are in contact with each other on both sides of each clearance 9, the tool holder 10 can have high rigidity.

In the case where the coupling part 15 is formed with the cutouts 19, the rigidity of cutting edge of the throwaway tip 13 is an important consideration. As to the rigidity, therefore, simulation analysis was made. Specifically, this analysis was performed by applying a predetermined load (100 N) to the cutting edge of the throwaway tip 13 from the side while the tool holder 10 is fixed to the holder holding part 31 and measuring a maximum displacement amount of the cutting edge S. In the case where no cutout 19 is formed, the maximum displacement amount was 0.35 mm.

In the case where the cutouts 19 were formed, the maximum displacement amount was 0.35 mm. The maximum displacement amount was unchanged.

In the present embodiment, in which the foreign-matter receiving clearances 9 are provided, a contact area of the tapered surface 15a and the tapered portion 31a is 73.6% as compared with the case where no foreign-matter receiving clearance 9 is provided. This corresponds to a reduction of 26.4% of the contact area, but the rigidity is not practically problematic.

As explained in detail above, the tool holder fixing structure of the second embodiment is arranged to fix the tool holder 10 for holding the tool 12 attached with the throwaway tip 13 to the tool-holder holding part 31 of the machine tool and the foreign-matter receiving clearances 9 are formed between the tool holder 10 and the holding part 31. Furthermore, the clearances 9 are formed in the circumferential range of +30° to −30° from the cutting-edge position SL of the throwaway tip 13 assumed as the original point and in the circumferential range of 150° or more and 210° or less from the cutting-edge position SL, respectively. Additionally, each clearance 9 is formed at the center of the contact surfaces of the tool holder 10 and the holding part 31. Accordingly, even when foreign matters enter between the tapered surface 15a of the tool holder 10 and the tapered portion 31a of the tool-holder holding part 31, the foreign matters entering in the circumferential range of +30° to −30° from the cutting-edge position SL and in the circumferential range of 150° to 210° from the cutting-edge position SL will be received in the foreign-matter receiving clearances 9. Thus, the foreign matters are unlikely to affect the machining accuracy of the throwaway tip 13.

Furthermore, the contact relation between the tapered surface 15a of the tool holder 10 and the tapered portion 31a of the tool-holder holding part 31 can be maintained on both ends of the contact surface (on both sides of each clearance 9). Accordingly, the tool holder 10 can have high rigidity. Even when the foreign matters enter between the tapered surface 15a of the tool holder 10 and the tapered portion 31a of the tool-holder holding part 31, the foreign matters entering in the circumferential range of +30° to −30° from the cutting-edge position SL and in the circumferential range of 150° to 210° from the cutting-edge position SL will be received in the foreign-matter receiving clearances 9. Thus, the foreign matters are unlikely to affect the machining accuracy of the throwaway tip 13.

A third embodiment of the present invention will be described below.

The third embodiment differs from the first embodiment in the shape of a tool holder and the shape of a cutout for forming a foreign-matter receiving clearance. The following explanation is therefore made with a focus on differences without repeating explanations of similar parts or components to those in the first embodiment.

Figure 10:
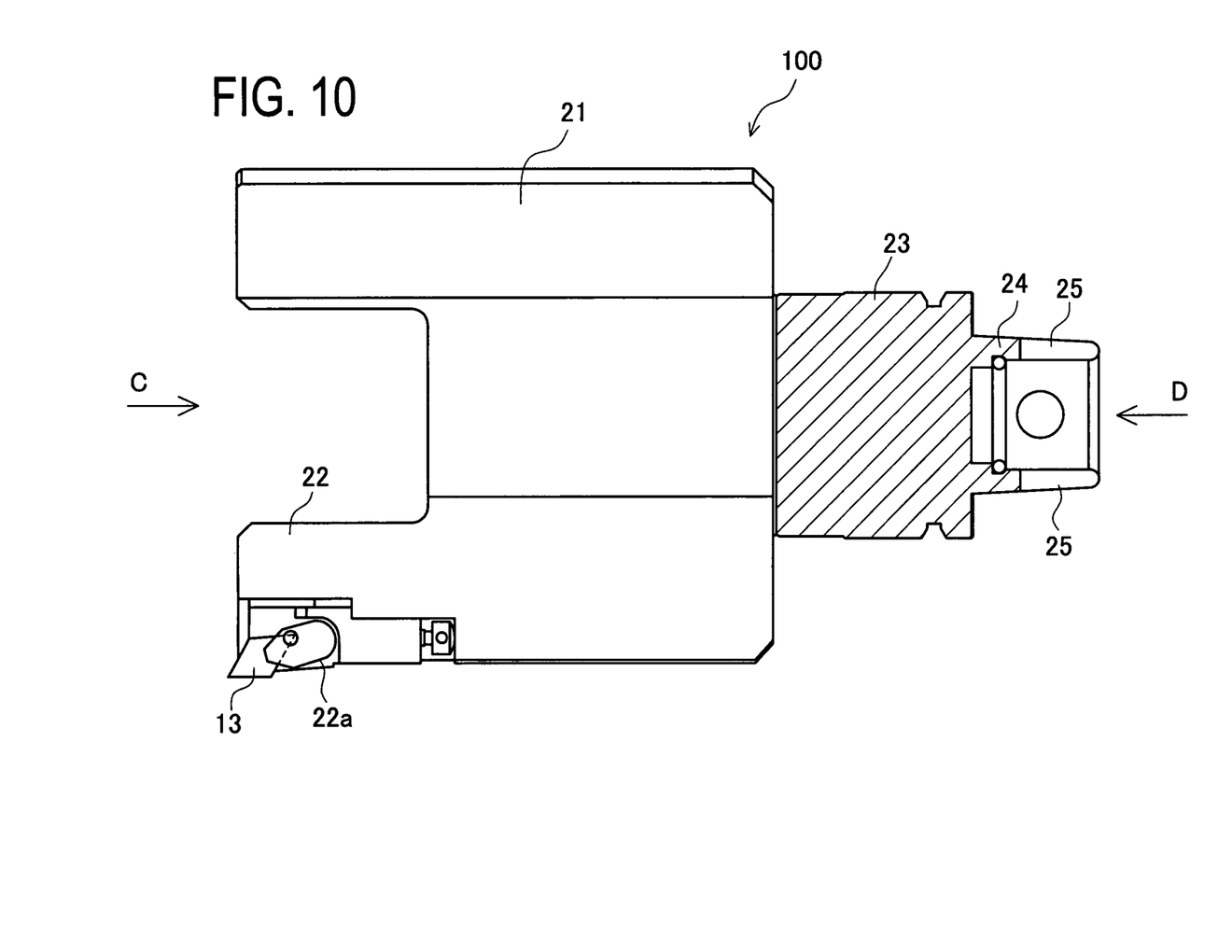
FIG. 10 is a front view of a tool holder of a third embodiment of the present invention.
Figure 11:
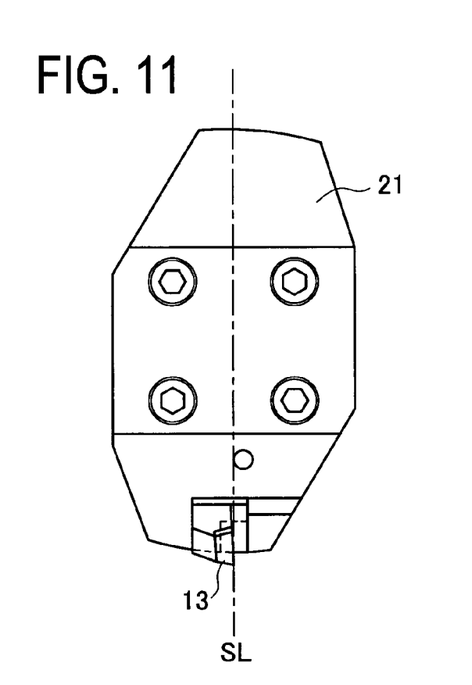
FIG. 11 is a side view of the tool holder as viewed in an arrow C in FIG. 10.
Figure 12:
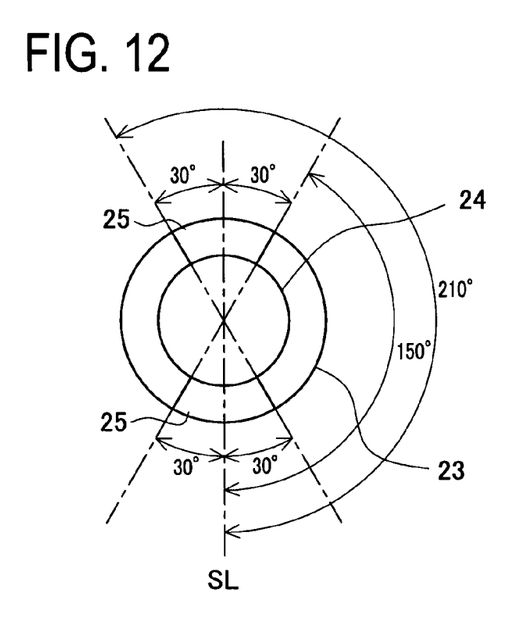
FIG. 12 is a side view of the tool holder as viewed in an arrow D in FIG. 10.

FIG. 10 is a front view of a tool holder 100 of the third embodiment. FIG. 11 is a side view of the same as viewed in the direction of an arrow C in FIG. 10 and FIG. 12 is a side view of the same as viewed in the direction of an arrow D in FIG. 10. The tool holder 100 in FIG. 10 is used for machining a large-diameter hole. This tool holder 100 includes a tool attachment part 21 formed in an angular U shape having two extended ends and the one end 22 thereof is removably attached with a throwaway tip 13 with a retainer 22a. The tool attachment part 21 is integrally connected, at a right end thereof, to a holder main body 23 formed with a coupling part 24 at a right end. In FIG. 10, the holder main body 23 and the coupling part 24 are shown in vertical cross-section. As shown in FIG. 12, the coupling part 24 is formed, on its outer periphery, with cutouts 25 for defining foreign-matter receiving clearances. In FIG. 12, the tool attachment part 21 is omitted for convenience.

As shown in FIG. 11, SL denotes a cutting-edge position of the throwaway tip 13. As shown in FIG. 12, the cutouts 25 are formed in a circumferential range of +30° to −30° on both sides of the cutting-edge position SL and in a circumferential range of 150° or more and 210° or less from the cutting-edge position SL, respectively.

As described in the third embodiment, the present invention can be applied to the tool holder 100 with the throwaway tip 13 for machining large-diameter hole.

Figure 15:
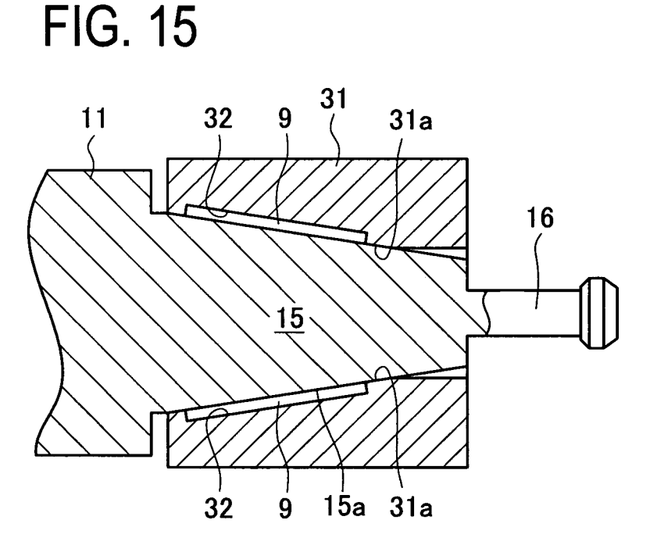
FIG. 15 is a cross sectional view of a tool holder mounted in a holding part of a machine tool in a modified example.

In the first, second, and third embodiments, the cutouts 17, 19, and 25 for foreign-matter receiving clearances are formed in the tapered surface 15a of the tool holder 10. As an alternative, as shown in FIG. 15, the tapered portion 31a of the tool-holder holding part 31 may be formed with cutouts 32 for providing clearances to receive foreign matters. In this case, the cutting-edge position SL of the throwaway tip 13 of the tool holder 10 has to be aligned with the tool-holder holding part 31 of the machine tool. However, such alignment work is not problematic when the tool holder 10 is mounted or dismounted with respect to the holding part 31 by use of robots.

The present invention is not limited to the above embodiment(s) and may be embodied in other specific forms without departing from the essential characteristics thereof.

For instance, in the above embodiments, the foreign-matter receiving clearances are formed in the circumferential range of +30° and −30° from the cutting-edge position of the throwaway tip assumed as the original point and in the circumferential range of 150° to 210° from the original point. Those angular ranges may be reduced to a circumferential range of +20° and −20° from the original point and a circumferential range of 160° or more and 200° or less from the original point. This configuration can enhance rigidity even though it may increase a risk of causing foreign matters to be caught.

The above embodiments are explained about the tool holder attached with the throwaway tip. The present invention may also be applied to a tool to which a cutting edge is fixed by brazing or a tool such as an end mill.

Furthermore, the configurations of the aforementioned first and second embodiments may be applied to a double hit holder, for example, HS, HSK, NC5, KM, BIG PLUS, BTS.

REFERENCE SIGNS LIST

9 Foreign-matter receiving clearance
10 Tool holder
13 Throwaway tip
15 Coupling part
15a Tapered surface
17, 19 Cutout for foreign-matter receiving clearance
31 Tool-holder holding part
31a Tapered portion
S Cutting edge
SL Cutting-edge position

The invention claimed is:

1. A tool holder fixing structure comprising: a tool including a cutting blade, a tool holder for holding the tool, and a tool-holder holding part of a machine tool for fixing the tool holder to the machine tool, and the tool holder and the tool-holder holding part have contact surfaces configured to form a clearance therebetween for receiving foreign matters, wherein the foreign-matter receiving clearance is provided in an entire angular region in a circumferential range of +30° and −30° from a point of a cutting edge of the cutting blade assumed as an original point and in an entire angular region in a circumferential range of 150° or more and 210° or less from the original point in a diametrical cross-section of the tool holder, and at a center of contact surfaces of the tool holder and the tool-holder holding part in an axial direction of the tool holder.

2. The tool holder fixing structure according to claim 1, wherein the cutting blade is a throwaway tip.

3. The tool holder fixing structure according to claim 1, wherein the contact surface of the tool holder is an outer peripheral surface formed with a cutout for providing the foreign-matter receiving clearance.

4. The tool holder fixing structure according to claim 1, wherein the contact surface of the tool-holder holding part is an inner surface formed with a cutout for providing the foreign-matter receiving clearance.

5. The tool holder fixing structure according to claim 1, wherein the area of the foreign-matter receiving clearance is to 28% or less of that of the contact surfaces of the tool holder and the tool-holder holding part.

* * * * *